US007568747B2

(12) United States Patent
Difford

(10) Patent No.: US 7,568,747 B2
(45) Date of Patent: Aug. 4, 2009

(54) CURVED AND ANGULAR PANEL ARM

(76) Inventor: Paul A. Difford, 34 Byron Road, Weston-Super Mare, N. Somerset BS 23 3XG (GB)

( * ) Notice: Subject to any disclaimer, the term of this patent is extended or adjusted under 35 U.S.C. 154(b) by 40 days.

(21) Appl. No.: 11/729,137

(22) Filed: Mar. 27, 2007

(65) Prior Publication Data

US 2008/0237956 A1 Oct. 2, 2008

(51) Int. Cl.
*B66C 1/02* (2006.01)
*B25J 15/06* (2006.01)

(52) U.S. Cl. ......................... 294/65; 294/64.1; 414/737

(58) Field of Classification Search ................... 294/65, 294/81.3, 81.4, 67.5, 67.2, 81.2, 81.56, 64.1; 414/680, 737
See application file for complete search history.

(56) References Cited

U.S. PATENT DOCUMENTS 4,221,356 A 9/1980 Fortune
4,685,714 A * 8/1987 Hoke ......................... 294/81.2
5,033,730 A * 7/1991 Davies et al. .............. 294/64.1
5,364,083 A 11/1994 Ross et al.
5,938,521 A * 8/1999 Jasek et al. ................. 452/192
D464,860 S * 10/2002 Mrsny .......................... D8/89
6,702,268 B1 3/2004 Nascimben
7,281,739 B2 * 10/2007 Kniss .......................... 294/65

FOREIGN PATENT DOCUMENTS

DE 19544463 * 11/1995

* cited by examiner

*Primary Examiner*—Paul T Chin
(74) *Attorney, Agent, or Firm*—Raymond M. Galasso; Galasso & Associates, L.P.

(57) ABSTRACT

Curved and Angular Panel Arm is an arm attachment for use with vacuum lifts that has a hinged section and a pivoting vacuum head mount. To use the preferred embodiment of Curved and Angular Panel Arm, a user attaches the arm to a vacuum lift unit using an attaching mechanism. The hinged section is then adjusted and locked into place to accommodate irregularly shaped objects using the hinge pin and clip or other locking mechanism. Finally, the vacuum pads of the pivoting vacuum head mount are placed on a designated panel or object and the vacuum lift unit is turned on, enabling the vacuum pads on the vacuum head mount to attach to the irregularly shaped panel or object.

4 Claims, 1 Drawing Sheet

CURVED AND ANGULAR PANEL ARM

CROSS REFERENCE TO RELATED APPLICATIONS

This United States Non-Provisional Patent Application does not claim priority to any United States Provisional Patent Applications or any foreign patent applications.

FIELD OF THE DISCLOSURE

The disclosures made herein relate generally to the building and construction industry. The invention discussed herein is in the general classification of attachments for vacuum lift units.

BACKGROUND

The building and construction industry is booming in the United States. Homes, offices and institutions are constantly being built, repaired or renovated. Painters, carpenters, carpet layers, roofers, electricians, and plumbers are in high demand to accomplish the many specialized tasks involved in any construction project.

Craftsmen and tradesmen use a variety of tools to complete their assigned tasks. Some of the tools are specific to a particular skill or trade. Plumbers, for example, make use of pipe wrenches while electricians often use wire connectors.

Large equipment used by workers on a job site may also be specialized. The scissors lift, snorkel lift, and bucket truck are but a few examples of specialized large equipment. These lifts and devices are used for reaching elevated areas or lifting materials such as shingles to a roof. These devices may be used by painters, electricians, roofers, plumbers, or a variety of other individuals.

A vacuum lift is a relatively new piece of equipment on the market. This lift is utilized for all different types and size panels and is particularly effective in lifting delicate objects. However, this lift has difficulty when confronted with curved and/or angular panels because the straight arm attachment to the device is not designed to handle irregularly shaped panels or other items. As a result, these types of panels and objects must often be lifted manually, risking injury to workers or breakage or damage to the panel or object.

Hence, there is a need in the art for an easy to use, inexpensive, durable and effective arm attachment for lifting irregularly shaped objects for use with traditional vacuum lift systems.

SUMMARY OF THE DISCLOSURE

Curved and Angular Panel Arm is an arm attachment for use with traditional vacuum lifts that is capable of lifting irregularly shaped panels or objects that have curves or angles. It consists of an arm attachment with an attaching mechanism to connect it to the vacuum lift unit on one end, a pivoting vacuum head mount on the other end and a hinged section.

The principal object of this invention is to provide an arm attachment for use with traditional vacuum lift systems capable of lifting irregularly shaped panels or other objects.

Another object of this invention is to provide an affordable arm attachment for use with vacuum lift systems capable of lifting irregularly shaped panels or other objects.

Another object of this invention is to provide an arm attachment that is easily and quickly installed on a traditional vacuum lift unit for lifting irregularly shaped panels or other objects.

Another object of this invention is to provide a safe arm attachment for use with traditional vacuum lift systems capable of lifting irregularly shaped panels or other objects.

Yet another object of this invention is to provide a durable arm attachment for use with traditional vacuum lift systems capable of lifting irregularly shaped panels or other objects.

DETAILED DESCRIPTION OF THE DRAWINGS

The preferred embodiment of Curved and Angular Panel Arm is comprised of at least some of the following: an arm, a hinged section, a hinge pin, a hinge clip, an attaching bracket, an attaching pin, an attaching clip, and a pivoting vacuum head mount with vacuum pads.

Figure 1:
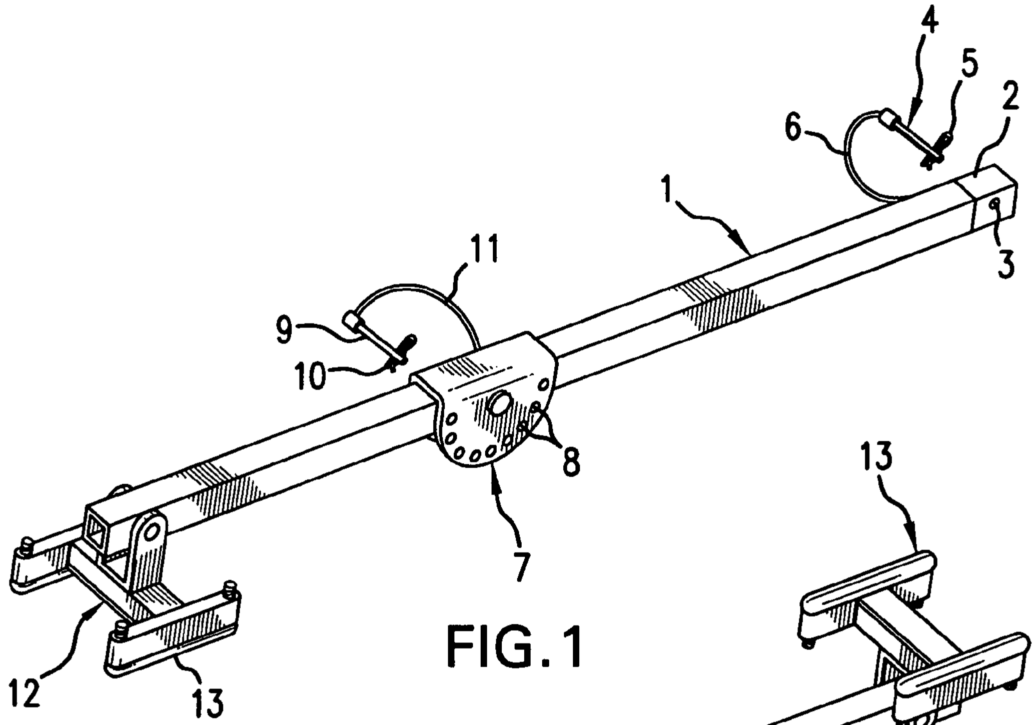
FIG. 1 depicts a perspective view of the preferred embodiment of the present invention.

In the preferred embodiment of the invention, shown in FIG. 1, an arm 1 made of galvanized steel and roughly rectangular in shape has an attaching bracket 2 on one end with and a hole 3 extending through the arm 1 and the attaching bracket 2. An attaching pin 4 is designed to pass through the hole 3 and be locked in place with a clip 5. To prevent loss of the attaching pin 4 when it is not in use, a chain 6 is attached to the bottom of the attaching pin 4 on one end and the arm 1 on the other end.

A hinged section 7 that is semicircular in shape is located in approximately the center of the arm 1 and has a plurality of holes 8 spaced along the perimeter. Within the hinged section 7, a hinge permits the arm 1 to bend at a variety of angles. The plurality of holes 8 permit the arm 1 to be locked into place with the use of a hinge pin 9 and clip 10 that are attached to the hinged section 7 via a chain 11 when they are not in use. The arm 1 has a hole (not pictured) located at the appropriate distance such that the hinge pin 9 can protrude through the arm 1 and hinged section 7.

On the end of the arm 1 opposite the attaching bracket 2, a pivoting vacuum head mount 12 permits vacuum pads 13 to seal along the curves or angles of irregularly shaped panels or objects when the arm 1 is in use.

Figure 2:
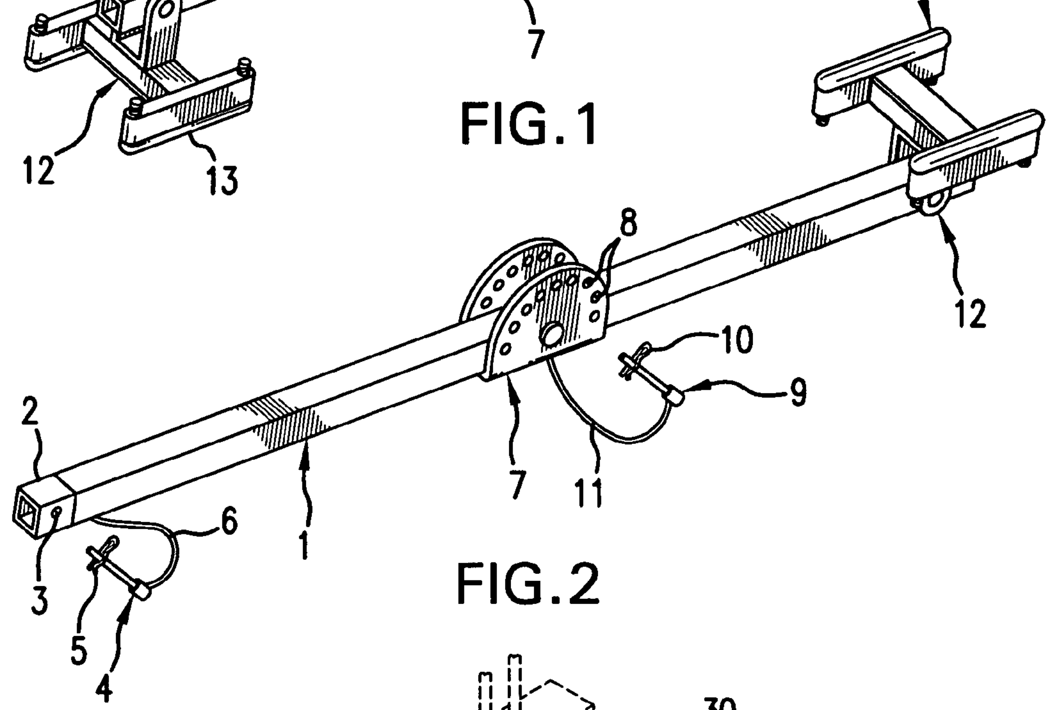
FIG. 2 depicts a bottom perspective view of the preferred embodiment of the present invention.

FIG. 2 depicts the bottom perspective view of the preferred embodiment of the invention. The vacuum pads 13 are clearly visible on the head mount 12 of the arm 1. The hinged section 7, plurality of holes 8, hinge pin 9 clip 10 and chain 11 are also visible. In addition, the attaching bracket 2, hole 3, attaching pin 4, clip 5, and chain 6 can be seen from this angle.

Figure 3:
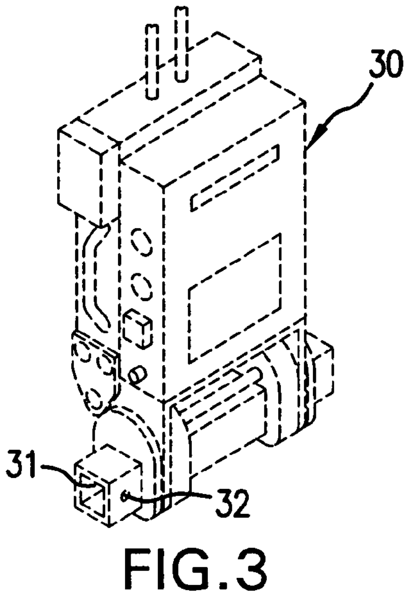
FIG. 3 depicts a perspective view of a traditional vacuum lifting unit.

FIG. 3 shows a perspective view of a traditional vacuum lift 30 used with the present invention. The attaching slot 31 that accepts the attaching bracket of the present invention is clearly visible. The attaching slot 31 also has a hole 32 to lock the arm in place through the use of the attaching pin and clip.

To use the preferred embodiment of Curved and Angular Panel Arm, a user attaches the arm to the vacuum lift unit using the attaching pin and clip. The hinged section is then adjusted and locked in place using the hinge pin and clip to accommodate irregularly shaped objects. Finally, the vacuum pads of the pivoting vacuum head mount are placed on a designated panel or object and the vacuum lift unit is turned on, enabling the vacuum pads on the pivoting vacuum head mount to attach to the irregularly shaped panel.

The components of Curved and Angular Panel Arm may vary but will likely use metal, plastic and electrical materials. The metals would ideally be selected from available steel or alloys of steel and aluminum. The production process related to the use of these metals insures that the metal is non-corrosive, durable and strong. The selected metal should have high impact strength and be capable of accepting and retaining coloring materials for an extended length of time. In the preferred embodiment, many of the components, including the arm, attaching bracket, attaching pin, attaching clip, hinged section, hinge pin, hinge clip and pivoting vacuum head mount, are made of metal.

The plastic used in the production will ideally be selected for durability and longevity. Thermoplastics are commonly used in the manufacturing of components similar to those used in this invention. Polyethylene, polypropylene, and other similar thermoplastic materials would be among those with the necessary traits. Members of this family are recognized universally as being versatile and of high quality.

The plastic components of Curved and Angular Panel Arm can also be formed with the use of plastic molding techniques, such as injection molding or blow molding. Injection molding requires melted plastic to be forcefully injected into relatively cool molds. As the plastic begins to harden, it takes on the shape of the mold cavity. This technique is ideal for the mass production of products. Alternatively, blow molding, a form of extrusion, could be utilized. Blow molding involves a molten tube being pushed into a mold. Compressed air then forces the molten tube against the cold walls of the mold.

All electronic components used with the invention will also be ideally selected from those currently having the highest industry ratings. These components will also meet and/or exceed all safety and usage regulations. Wiring and associated connecting hardware should be insulated and otherwise protected from intrusion by any harmful or degrading elements, including water, medium level temperatures, and low to medium impact force.

It should be obvious that the components of the present invention can be of various shapes and sizes. It should also be obvious that the components of the invention can be made of different types of metals, plastics or other suitable materials and can be of any color.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A device for use with vacuum lifts comprising:

an arm with an attaching mechanism on the end, wherein said arm is made of galvanized steel, wherein said arm is rectangular in shape;

a hinged section on the arm, wherein the hinged section is approximately semicircular in shape contains a hinge and is located in approximately the center of the arm and has a plurality of holes spaced along the perimeter; and a pivoting vacuum head mount with a vacuum pad on the end of the arm opposite the attaching mechanism, said pivoting vacuum head mount pivotable to permit said vacuum pad to seal along the surfaces of irregularly shaped panels or objects.

2. The device of claim 1 wherein a hinge pin and a hinge clip are capable of locking the arm at various angles through the hinged section.

3. The device of claim 2 wherein a hinge pin chain connects to the bottom of the hinge pin on one end and to the hinged section on the other end.

4. A device for use with vacuum lifts comprising:

an arm that is approximately rectangular and made of galvanized steel having an attaching bracket with a hole that extends through the arm and attaching bracket and an attaching pin with an attaching clip;

an attaching pin chain connected on one end to the attaching pin and on the other end to the arm;

a hinged section in approximately the center of the arm that is approximately semicircular in shape and contains a hinge and has a plurality of holes spaced along the perimeter;

a hinge pin and a hinge clip capable of locking the arm at various angles through the hinged section;

a hinge pin chain that connects to the bottom of the hinge pin on one end and to the hinged section on the other end; and a pivoting vacuum head with a first vacuum pad and a second vacuum pad on the end of the arm opposite the attaching bracket, said pivoting vacuum head pivotable to permit said vacuum pads to seal along the surfaces of irregularly shaped panels or objects.

* * * * *